US00H002088H

(19) United States

(12) Statutory Invention Registration (10) Reg. No.: US H2088 H

Stafford et al. (43) Published: Nov. 4, 2003

(54) METHOD FOR REDUCING PLATE-OUT IN A STRETCH BLOW MOLDED CONTAINER

(75) Inventors: Steven Lee Stafford, Gray, TN (US); Lavonna Suzanne Buehrig, Kingsport, TN (US); Louis Thomas Germinario, Kingsport, TN (US); Terrill M. McGee, Blountville, TN (US); Gary Wayne Minnick, Kingsport, TN (US); Eric Jon Moskala, Kingsport, TN (US); Michael Eugene Donelson, Gray, TN (US)

(73) Assignee: Eastman Chemical Company, Kingsport, TN (US)

(21) Appl. No.: 10/185,915

(22) Filed: Jun. 27, 2002

(65) Prior Publication Data

US 2003/0001317 A1 Jan. 2, 2003

Related U.S. Application Data

(60) Provisional application No. 60/302,161, filed on Jun. 29, 2001.

(51) Int. Cl.[7] ..... B29C 39/02

(52) U.S. Cl. ..... 264/532; 53/471

(58) Field of Search ..... 264/532; 53/471

(56) References Cited

U.S. PATENT DOCUMENTS 5,090,180 A 2/1992 Sörensen

FOREIGN PATENT DOCUMENTS

DE 19934320 A1 1/2001

JP 62-30019 A 2/1987

JP 03-207748 A 9/1991

WO WO 01/19594 A1 3/2001

*Primary Examiner*—Michael J. Carone

*Assistant Examiner*—M. Thomson

(74) *Attorney, Agent, or Firm*—Bernard J. Graves, Jr.

(57) ABSTRACT

A method for reducing or eliminating plate-out during the process used to produce stretch blow molded containers from polyester preforms by crystallizing the low molecular weight polyester molecules in or on the preform exterior surface before stretch blow molding the preform into a container. The molecules are crystallized using a crystallization process selected from (1) treating the outer surface of the preform with a solvent that is capable of crystallizing low molecular weight polyester molecules in polyester or (2) heating the outer surface of the preform to a temperature and for a time suitable for crystallizing low molecular weight polyester molecules in polyester. Plate-out is reduced because the crystallized molecules do not migrate out of the preform and form plate-out deposits on the mold.

24 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Blow Mold Plateout Rates of HEATWAVE® Polymer

Average Mold Reflectance over Time

Correlation of Bottle Sidewall Haze and Mold Reflectance

METHOD FOR REDUCING PLATE-OUT IN A STRETCH BLOW MOLDED CONTAINER

CROSS-REFERENCE TO RELATED APPLICATIONS

This application claims priority to U.S. Provisional Application Ser. No. 60/302,161, filed Jun. 29, 2001, the entire disclosure of which is incorporated herein by reference.

BACKGROUND OF THE INVENTION

1. Field of Invention

This invention relates generally to methods for reducing plate-out during the process used to produce stretch blow molded containers from polyester preforms and particularly to methods for reducing plate-out by crystallizing low molecular weight polyester molecules in the preform exterior surface.

2. Description of Related Art

Heat-set stretch blow molded containers are made using methods that yield containers with a high degree of thermal stability, i.e., minimal shrinkage after hot-filling. These containers can be hot-filled, pasteurized, washed at high temperatures, or used for any other applications where a high degree of thermal stability is required. These containers must be useful in processes that would distort normal polyester containers, particularly poly (ethyleneterephthalate) ("PET") carbonated soft drink (CSD) bottles.

During the process of preparing heat-set stretch blow molded containers, the container preform is heated to higher temperatures than are normal for a CSD bottles. Normal preform skin temperatures for CSD bottles at the blow station are 20° to 25° C. above the glass transition temperature, i.e., about 100 to about 105° C. In the heat-set process, the preform skin temperature at the blow station can be as high as 30–35° C. above the glass transition temperature, i.e., about 110 to about 115° C. The blow mold temperature is also much higher. In a CSD process, the mold is usually maintained at about 10° C. In contrast, in a heat-set process the mold is elevated to about 110° C. to about 140° C. The mold surface contact time is also greatly increased to increase container crystallinity.

At these higher preform and mold temperatures, low molecular weight molecules on or in the polyester preform outer surface (i.e., mainly cyclic trimer and other linear low molecular weight species such as dimer, trimer, tetramer, etc.) become very mobile and tacky. These low molecular weight molecules leave the surface of the preform and adhere to the surface of the mold. Over time, the amount of these low molecular weight molecules adhering to the mold surface increases. The temperature of the mold surface is sufficient to induce thermal crystallization of these species and also ring-opening polymerization. As these deposits crystallize, they become very hard. Also, they build up sufficiently on the surface until they impart imperfections into the bottle surface as well as adhering to the bottle surface. The imperfections and crystallized particles refract light and cause undesired haze in the bottle surface. At some point during production, the stretch blow heat-setting process must be stopped to clean this plate-out deposit from the mold surface. For some current processes, cleaning the molds is conducted as often as once a day.

While some art exists indicating solvent or thermal crystallization of polyesters to improve the thermal stability of polyester bottles, no art indicates that crystallizing the surface will decrease mold plate-out. JP 3207748 and JP 216081 disclose adding a small amount of polyamide nucleator to aid crystallization of the entire thickness of the bottle during the heat-set process to improve thermal stability. However, there is no mention of any improvement in reducing mold plate-out or any reason to preferably crystallize the skin of the preform only. U.S. Pat. No. 5,090,180 discloses thermally crystallizing the entire thickness of the base during the stretch blow process to improve thermal and mechanical stability of the bottle, however, nothing is said about decreasing mold plate-out. JP 62030019 discloses thermally crystallizing the entire bottle before the second stretch blow step of a two step stretch blow process. The resulting bottle is disclosed to have reduced internal residual strain and a low degree of haze, however, there is no mention of any improvement in mold plate-out. JP 58119829 discloses passing the preform through a flame treatment to melt the surface, which should cause some thermal crystallization, and reduce surface defects without imparting haze. However, there is no mention of a reduction in mold plate-out.

JP 56150516 and JP 53110669 disclose solvent crystallizing the neck and mouth of the bottle, after the stretch blow process, to improve solvent-crack resistance in the bottle without increasing the haze level in those regions. However, there is no mention of reducing mold plate-out. DE 19934320-A1 discloses that blowing the preform with superheated air and decreasing mold temperature significantly produces a thermally stable bottle with reduced plate-out for heat-set applications. Crystallizing the preform outer surface is not disclosed. WO 01/19594 discloses inducing crystallinity in a plastic container by heating an interior surface of the plastic container. None of these references disclose methods for reducing or eliminating plate-out. There is, therefore, a need for methods for eliminating plate-out.

SUMMARY OF THE INVENTION

It is, therefore, an object of the present invention to provide a method for reducing or eliminating plate-out during the process used to produce stretch blow molded containers from polyester preforms.

It is another object of the present invention to provide a preform that will reduce or eliminate plate-out during the process used to produce stretch blow molded containers from polyester preforms.

It is another object of the present invention to provide a method for making blow molded containers from polyester performs having from about 0.01% to about 2% low molecular weight polyester molecules in the preform.

These and other objects are achieved using a method that crystallizes low molecular weight polyester molecules in or on the preform exterior surface (with the exception of the support ring and the finish) before stretch blow molding the preform into a container. The molecules are crystallized using a crystallization process selected from (1) treating the outer surface of the preform with a solvent that is capable of crystallizing low molecular weight polyester molecules in polyester or (2) heating the outer surface of the preform to a temperature and for a time suitable for crystallizing low molecular weight polyester molecules in polyester. The crystallized molecules do not migrate out of the preform and form plate-out deposits on the mold. It has been surprisingly found that the method of the present invention reduces, and in some situations eliminates, the need to stop the heat-set stretch blow mold process because of mold plate-out.

Other and further objects, features and advantages of the present invention will be readily apparent to those skilled in the art.

DETAILED DESCRIPTION OF THE INVENTION

Figure 1:
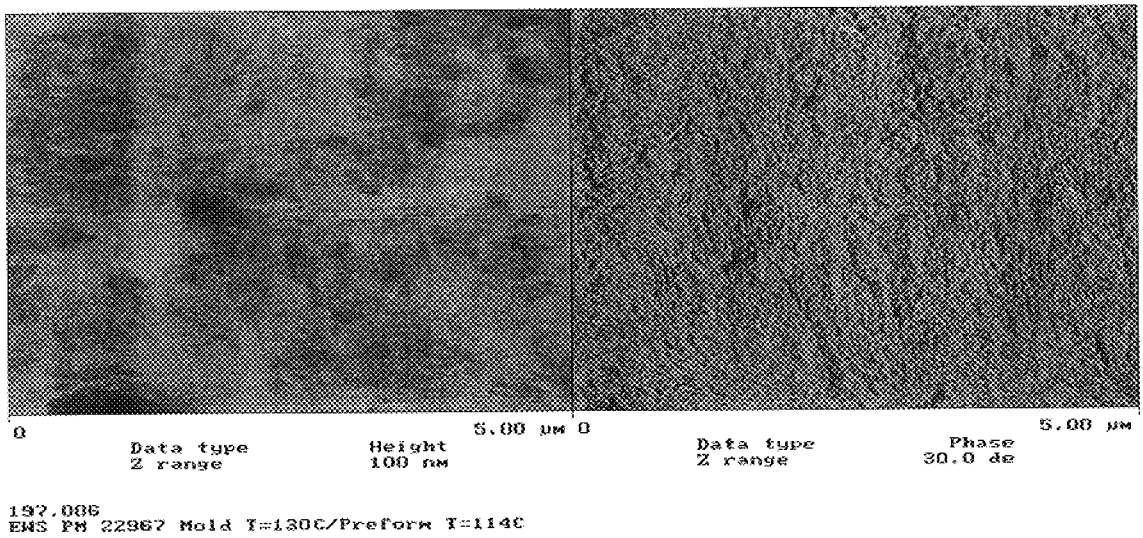
FIG. 1 is a micrograph (image size of 5×5 microns) of the sidewall exterior surface of a conventional heat-set container (formed using a preform temperature of about 114° C., mold temperature of about 130° C.).

In one aspect, the present invention is a method for reducing or eliminating plateout during the process used to produce stretch blow molded containers from polyester preforms by preferentially crystallizing low molecular weight polyester molecules in or on the preform exterior surface before stretch blow molding the preform into a container. In a further aspect, the present invention is a container made using the method of the present invention.

In another aspect, the present invention is a polyester preform useful for reducing or eliminating plate-out during the process used to produce stretch blow molded containers from polyester preforms. The preform is produced by preferentially crystallizing low molecular weight polyester molecules in or on the preform exterior surface before stretch blow molding the preform into a container.

In another aspect, the present invention is a method for making a polyester preform useful for reducing or eliminating plate-out during the process used to produce stretch blow molded containers from polyester preforms by preferentially crystallizing low molecular weight polyester molecules in or on the preform exterior surface.

The low molecular weight polyester molecules in or on the preform exterior surface are crystallized using any process suitable for crystallizing low molecular weight polyester molecules. Preferably, the molecules are crystallized using a crystallization process selected from (1) treating the outer surface of the preform with a solvent that is capable of crystallizing low molecular weight polyester molecules in polyester or (2) heating the outer surface of the preform to a temperature and for a time suitable for crystallizing low molecular weight polyester molecules in polyester. The preform surface is treated by exposing or contacting the surface to the solvent in a manner that crystallizes low molecular weight polyester molecules.

The crystallization process crystallizes low molecular weight polyester molecules in or on the preform exterior surface. The low molecular weight polyester molecules are cyclic trimer, linear dimer, trimer, tetramer, and similar polyester molecules having a molecular weight of less than about 2000, preferably from about 384 to about 1000. Generally, the concentration of these low molecular weight molecules is less than about 2% by weight of the polyester polymer, preferably from about 0.01% to about 2% by weight, most preferably from about 0.1% to about 1% by weight.

In one embodiment, the crystallization process used to crystallize low molecular weight polyester molecules in the preform exterior surface comprises exposing or contacting the exterior surface of the preform to a solvent. The concentration of crystallized molecules and the depth of crystallization into the preform exterior surface are controlled by controlling the time the preform is exposed to the solvent, the solvent used to crystallize the molecules, the temperature of the perform, and the temperature of the solvent. If the exposure time is too long, the solvent will penetrate too deeply into the preform and crystallized molecules will form below the surface and cause undesirable haze in the container produced from the preform. Contact times useful in the present invention are from about 0.1 to about 20 seconds, preferably from about 0.5 to about 5 seconds. Shorter times are required for rapid crystallization solvents and higher temperatures. In acetone, only 0.1 to about 3 seconds, preferably about 1 or 2 seconds, are required at room temperature to crystallize the surface without causing haze. In some embodiments, any residual solvent should be removed from the preform prior to stretch blow molding, generally by evaporation or rinsing.

Any solvent that crystallizes low molecular polyester molecules can be used in the present invention. Such solvents include ketones, esters, ethers, chlorinated solvents, nitrogen containing solvents, and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, and mixtures thereof. Preferred solvents include acetone, methyl ethyl ketone, cyclohexanone, methyl acetate, ethyl acetate, dimethylsulfoxide, and mixtures thereof.

In another embodiment, the crystallization process used to crystallize low molecular weight polyester molecules in the preform exterior surface comprises heating the exterior surface of the perform. The concentration of crystallized molecules and the depth of crystallization into the preform exterior surface are controlled by controlling the temperature of the preform surface and the time the preform is exposed to the temperature. The temperature and time necessary to crystallize the polyester molecules in the preform surface will vary depending upon the materials and conditions used in the process, including the composition of the polymer, thickness of the perform, distance: of the preform from the heat source, heat source used, time of exposure of the preform to the heat source, ventilation around the perform, and voltage applied to the heat source. Preferably, the preform surface is heated to a temperature of from about 100° C. to about 150° C. for a period of from about 1 to about 26 seconds.

Quartz lamps are very common heat sources in the stretch blow molding industry, but any heat source capable of inducing the desired crystallization may be used. Other examples include forced hot air, superheated steam, and convective heat such as a cal-rod type heater. For a polymer having a composition of about 3 mole% isophthalic acid and about 1.5 weight% diethylene glycol ("EG"), a preform exterior: surface temperature of about 120° C. to about 130°

C. is required to produce the desired crystallization before the preform enters the stretch blow station. In a conventional process, a preform of the same composition being stretch blow molded in the same equipment would have a surface temperature of about 112° C. to about 114° C. to blow a non-pearlescent bottle (clear bottle). Heat-set containers require polymer compositions which will readily crystallize. However, since it is only necessary to crystallize the low molecular weight molecules on the preform exterior surface, polymer composition has relatively little effect of the crystallization conditions used in the present invention.

Plate-out is caused by sticky, amorphous low molecular weight polyester molecules that migrate to the container surface out of the polymer and deposit on the container mold. As the molecular weight of the polyester molecules increase, the likelihood that the molecule will migrate out of the polymer during the molding process and cause plate-out decreases. Therefore, if most or all of the low molecular weight polyester molecules can be crystallized, plate-out can be reduced or eliminated. When these low molecular weight molecules are transformed according to the present invention from the amorphous phase where they become tacky at about 80° C. to the crystalline phase where tackiness is essentially eliminated at typical mold temperatures used for heat-set stretch blow molded containers, the low molecular weight molecules behave very differently when in contact with the mold having a temperature used for making heat-set stretch blow molded containers. In the crystalline form, the cyclic low molecular weight molecules have melting points above about 300° C. and the linear low molecular weight molecules have melting points above about 200° C. Since the mold temperature in the blow molding process is between about 100° C. and about 150° C.; plate-out caused by these low molecular weight molecules is reduced or eliminated by crystallizing them to form crystallized molecules with melting points above about 200° C. These crystallized low molecular molecules do not migrate out of the polymer, become sticky, adhere to the mold,: and leave the deposits responsible for plate-out.

Figure 2:
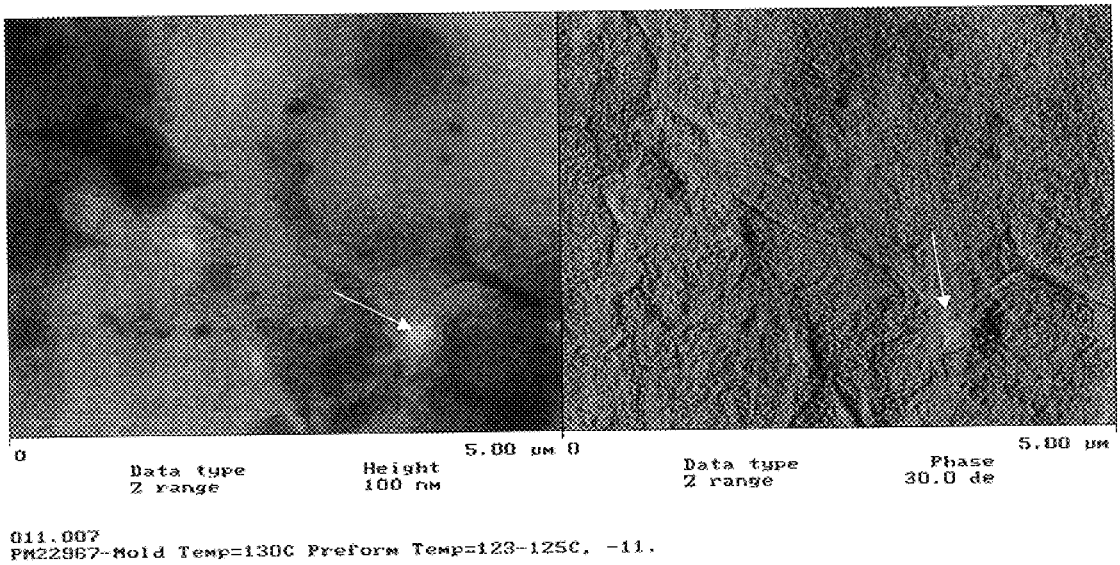
FIG. 2 is a micrograph (image size of 5×5 microns) of the sidewall exterior surface of a heat-set container which was surface crystallized prior to blow molding at a preform surface temperature of 123° C. and a mold temperature of 130° C.
Figure 3:
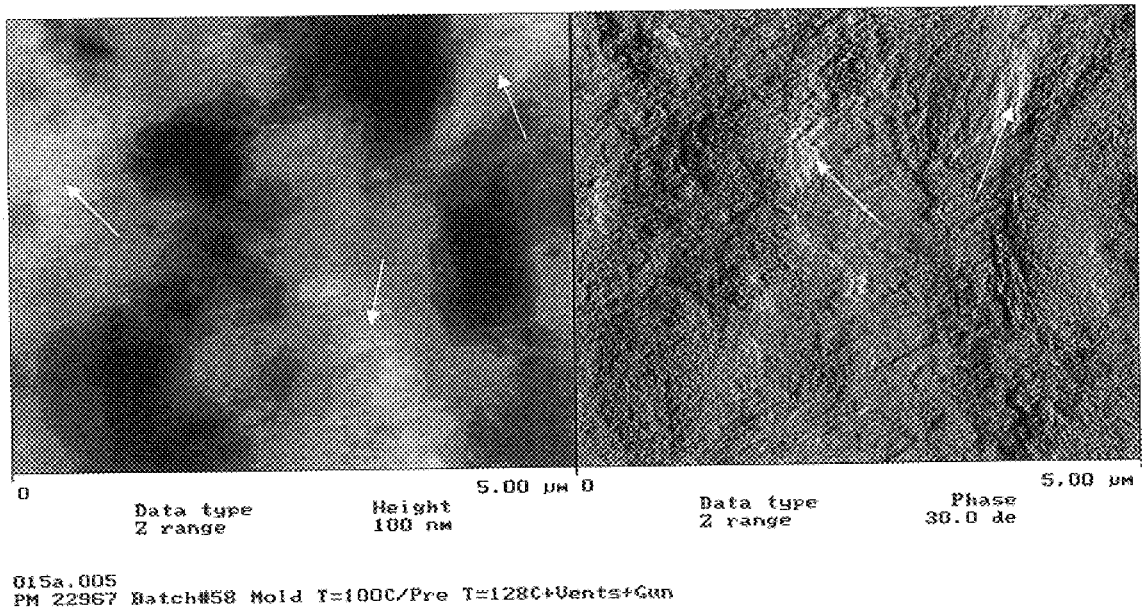
FIG. 3 is a micrograph (image size of 5×5 microns) of the sidewall exterior surface of a heat-set container which was surface crystallized prior to blow molding at a preform surface temperature of 128° C. and a mold temperature of 100° C.

As stated, plate-out is beneficially reduced or eliminated when the low molecular weight molecules on and in the preform exterior surface are crystallized. This preform exterior surface crystallization is readily seen in photomicrographs of preforms treated according to the present invention and containers made from such preforms. FIG. 1 shows the sidewall exterior surface of a conventional heat-set container formed using a preform temperature of about 114° C. and mold temperature of about 130° C. The surface is smooth and substantially free from texture caused by crystallinity. Visually, the micrograph of the surface is relatively smooth and displays no deep, broad valleys. There are few, if any, crystalline regions on container surface (shown by the arrows in FIG. 1). The surface roughness of the container wall was measured by evaluating 10 random $5\times5\mu$ sections on one sample and calculating the root mean square of the measured surface heights. The surface roughness for the container of FIG. 1 was 4 nanometers (nm). FIGS. 2 and 3 show the exterior surfaces of containers crystallized according to the present invention in which the preform is superheated prior to blow molding. The micrographs show undulating surfaces with many wide deep valleys. FIG. 2 shows that there are some crystalline regions on surface (shown by the arrows). FIG. 3 shows that there are many crystalline regions on surface (shown by the arrows). The surface roughness for the container surfaces imaged in FIGS. 2 and 3 are 10 nm and 14 nm, respectively.

The depth of the crystallinity within the container thickness is not critical so long as the haze of the final container's sidewall does not exceed about 5%, preferably about 3%.

Some newer stretch blow machines such as Series two models commercially available from Sidel and Krupp are equipped with sufficient ventilation and heating elements and/or controls to produce the required preform surface temperatures without modifying the equipment. However, some older stretch blow machines are not equipped to produce the required surface temperatures and would therefore require that production rates be slowed to produce the necessary crystallization. Slowing production rates is undesirable for commercial reasons. For this older equipment, an external heating source such as forced hot air, superheated steam, convective heat such as a cal-rod type heater, or other similar sources are added to the equipment prior to the stretch blow molding step. Unless the preform surface can be preferentially heated, thermally induced crystallization could occur throughout the thickness of the preform resulting in undesirable haze.

To produce containers having desirable hot fill characteristics it is necessary to blow the container into a mold having a temperature of at least about 100° C., preferably from about 100° C. to about 150° C. Also, the reheat temperature for the preform is from about 100° C. to about 120° C. to allow the container to be blown as hot as possible without generating too much crystalline haze. Containers formed in this way have a % crystallinity suitable to attain a "hot-fill" status at approximately 95° C.

Any polyester polymer that can be used to form a suitable hot fill container via the two stage stretch blow molding process may be used in the present invention. The polyesters are any crystallizable polyester homopolymer or copolymer suitable for use in packaging, and particularly food packaging. Suitable polyesters are generally known in the art and may be formed from aromatic dicarboxylic acids, esters of dicarboxylic acids, anhydrides of dicarboxylic esters, glycols, and mixtures thereof. More preferably the polyesters are formed from repeat units comprising terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol, 1,4-butanediol, and mixtures thereof.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and similar compounds.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, mixtures thereof and similar compounds. Polyesters may be prepared from two or more of the above diols.

The polymer also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Also, although not required, additives normally used-in polyesters may be used if desired. Such additives include, but are not limited to colorants, toners, pigments, carbon black, glass fibers, fillers, impact modifiers, antioxidants, antiblocks, stabilizers, flame retardants, reheat aids, acetaldehyde reducing compounds, oxygen scavengers, barrier enhancing aids and similar additives.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Figure 4:
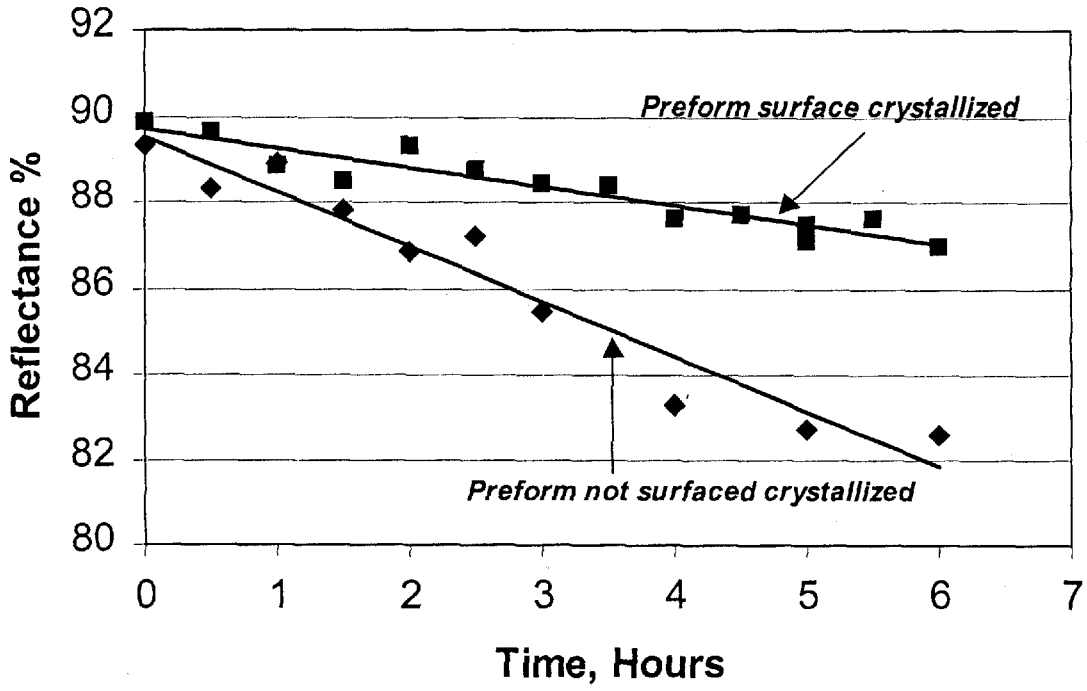
FIG. 4 is a graph showing the blow mold plate-out rates of HEATWAVE polymer.

48 g preforms (2 liter container, 156 mil sidewall thickness) made from HEATWAVE® PET, commercially available from Eastman Chemical Company, were molded on a Husky injection-molding machine at normal processing conditions. The preforms were reheated on a Sidel SBO 2/3 HR stretch blow-molding machine with the ventilation lowered to a minimum level (i.e. 35%) to increase surface temperature. A 10 amp, 1200 watt forced air heater was positioned downstream from the heater exit to also increase the preform surface temperature, to about 128° C. These preforms were then blown at normal processing conditions into a 32 oz paneled, heat-set mold that was heated to about 100° C. A Banner OPBT3QD optical sensor measured the reflectance change as polymer plate-out was deposited onto the blow mold. The sensor was positioned about 2.75 in. (7 cm) from the mold surface such that it monitored the reflectance of the top portion of one mold panel. The sensor was mounted onto a specially fabricated jig that positioned it uniformly relative to the mold surface. Readings were obtained initially and then at either 30 minute or hourly intervals. The initial reading at time zero was for the clean mold surface and the blow-molding machine was stopped for each measurement.:

Typical reflectance results for HEATWAVE® surface crystallized preforms blown into a 100° C. mold are shown in FIG. 4. These data are compared to HEATWAVE® (non surface-crystallized) pre-forms with a surface temperature of about 114° C. blown into a mold heated to about 130° C. (typical, commercial heat-set processing conditions). The substantially lower reflectance rate (about 3×) or slope of the line representing the surface crystallized pre-forms is evident from the graph where $y=-0.449x+89.745$ with an $R^2$ of 0.8865 for preform surface crystallization and $y=-1.2798x+89.528$ with an $R^2$ of 0.9383 for normal preform reheat. Visual observations of both mold plate-out accumulation and bottle sidewall haze showed a lower plate-out rate for the treated preforms. Hot-fill shrinkage performance of bottles blown from the surface crystallized preforms was about 1.2% volumetric shrinkage at 95° C. fill temperature. The industry standard is less than 2% at 90° C. on fresh bottles and less than 2% at 85° C. on aged bottles. Replicates of this plate-out experiment for crystallized HEATWAVE® preforms produced similar reflectance or plate-out rates of 0.465 and 0.482 that support the results of FIG. 4.

Figure 5:
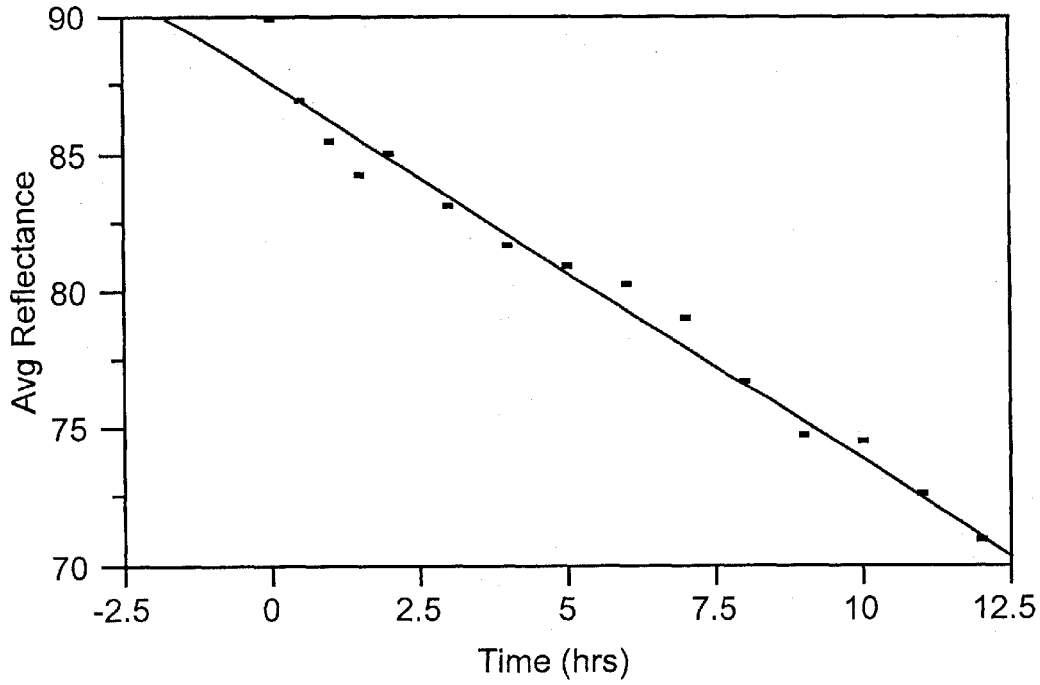
FIG. 5 is a graph showing reflectance vs. time of the mold surface.
Figure 6:
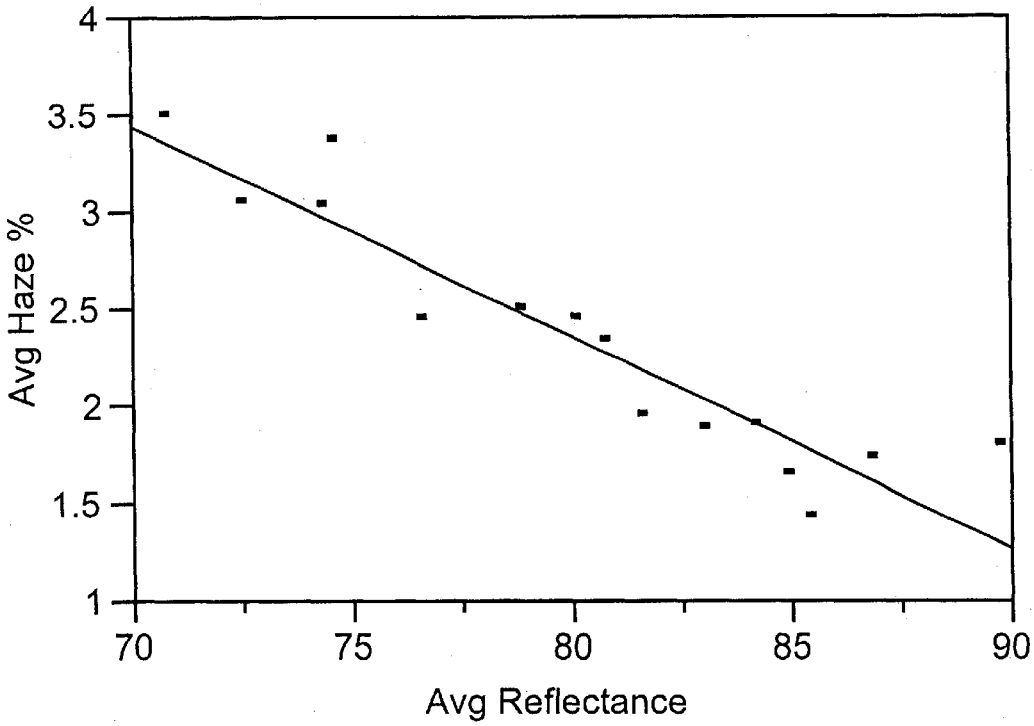
FIG. 6 is a graph haze v. reflectance of containers made in Example 1.

To verify the correlation between reflectance rate and mold plate-out rate, bottles were collected immediately prior to machine stoppage for reflectance measurements. Haze was measured on the bottle panel that corresponded to the mold panel on which reflectance was determined. Percent (%) haze was measured on a HunterLab Colorimeter by ASTM D-1003. The reflectance data are shown in FIG. 5 and these results are similar to those of FIG. 2. Referring to FIG. 6, a good correlation ($R^{2=0.86}$) exists between haze and reflectance, thus giving quantitative credibility to the mold reflectance-plate-out correlation.

In the drawings and specification, there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

We claim:

1. A method for reducing or eliminating plate-out during the process used to produce stretch blow molded containers from polyester preforms comprising crystallizing at least a portion of the low molecular weight polyester molecules at the exterior surface of the preform before stretch blow molding the preform into a container.

2. The method of claim 1 wherein the low molecular weight polyester molecules are crystallized using a process selected from the group consisting of treating the outer surface of the preform with a solvent that is capable of crystallizing low molecular weight polyester molecules in polyester and heating the outer surface of the preform to a temperature and for a time suitable for crystallizing low molecular weight polyester molecules in polyester.

3. The method of claim 1 wherein the low molecular weight polyester molecules are crystallized by treating the outer surface of the preform with a solvent that is capable of crystallizing low molecular weight polyester molecules in polyester.

4. The method of claim 3 wherein the solvent is selected from the group consisting of ketones, esters, ethers, chlorinated solvents, nitrogen containing solvents, and mixtures thereof.

5. The method of claim 3 wherein the solvent is selected from the group consisting of acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, and mixtures thereof.

6. The method of claim 3 wherein the solvent is selected from the group consisting of acetone, methyl ethyl ketone, cyclohexanone, methyl acetate, ethyl acetate, dimethylsulfoxide, and mixtures thereof.

7. The method of claim 3 wherein the outer surface of the preform is treated with a solvent for from about 0.1 to about 20 seconds.

8. The method of claim 3 wherein the solvent is acetone.

9. The method of claim 8 wherein the outer surface of the preform is treated with acetone for from about 0.2 to about 3 seconds.

10. The method of claim 3 further comprising the step of removing residual solvent from the preform prior to stretch blow molding.

11. The method of claim 1 wherein the low molecular weight polyester molecules are crystallized by heating the outer surface of the preform to a temperature and for a time suitable for crystallizing low molecular weight polyester molecules in polyester.

12. The method of claim 11 wherein the preform surface is heated to a temperature of from about 100° C. to about 150° C. for a period of from about 1 to about 26 seconds.

13. The method of claim 1 wherein the polyester preform contains from about 0.01% to about 2% low molecular weight polyester molecules in the preform.

14. The method of claim 1 further comprising blow molding the preform into a container.

15. A container made using the method of claim 14.

16. A method for making a polyester preform useful for reducing or eliminating plate-out during the process used to produce stretch blow molded containers from polyester preforms comprising crystallizing low molecular weight polyester molecules at the preform exterior surface.

17. The method of claim 16 wherein the low molecular weight polyester molecules are crystallized using a process selected from the group consisting of treating the outer surface of the preform with a solvent that is capable of crystallizing low molecular weight polyester molecules in polyester and heating the outer surface of the preform to a temperature and for a time suitable for crystallizing low molecular weight polyester molecules in polyester.

18. The method of claim 16 wherein the low molecular weight polyester molecules are crystallized by treating the outer surface of the preform with a solvent that is capable of crystallizing low molecular weight polyester molecules in polyester.

19. The method of claim 16 wherein the low molecular weight polyester molecules are crystallized by heating the outer surface of the preform to a temperature and for a time suitable for crystallizing low molecular weight polyester molecules in polyester.

20. A polyester preform made using the method of claim 16.

21. A polyester preform useful for reducing or eliminating plate-out during the process used to produce stretch blow molded containers from polyester preforms comprising a polyester preform having crystallized low molecular weight polyester molecules in or on the preform exterior surface.

22. The preform of claim 21 wherein the low molecular weight polyester molecules have been crystallized using a process selected from the group consisting of treating the outer surface of the preform with a solvent that is capable of crystallizing low molecular weight polyester molecules in polyester and heating the outer surface of the preform to a temperature and for a time suitable for crystallizing low molecular weight polyester molecules in polyester.

23. The preform of claim 21 wherein the low molecular weight polyester molecules have been crystallized by treating the outer surface of the preform with a solvent that is capable of crystallizing low molecular weight polyester molecules in polyester.

24. The preform of claim 21 wherein the low molecular weight polyester molecules have been crystallized by heating the outer surface of the preform to a temperature and for a time suitable for crystallizing low molecular weight polyester molecules in polyester.

* * * * *